(12) United States Patent
Patel et al.

(10) Patent No.: US 9,583,013 B2
(45) Date of Patent: Feb. 28, 2017

(54) METHOD AND SYSTEM FOR EEG-BASED TASK MANAGEMENT

(71) Applicants: Ami Patel, Trabuco Canyon, CA (US); Haisong Gu, Cupertino, CA (US)

(72) Inventors: Ami Patel, Trabuco Canyon, CA (US); Haisong Gu, Cupertino, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 353 days.

(21) Appl. No.: 13/780,838

(22) Filed: Feb. 28, 2013

(65) Prior Publication Data

US 2014/0242559 A1 Aug. 28, 2014

(51) Int. Cl.
*A61B 5/16* (2006.01)
*G09B 5/00* (2006.01)

(52) U.S. Cl.
CPC .................................. *G09B 5/00* (2013.01)

(58) Field of Classification Search
USPC ........................................................ 434/236
See application file for complete search history.

(56) References Cited

U.S. PATENT DOCUMENTS

| | | | |
|---|---|---|---|
| 5,406,957 A | 4/1995 | Tansey | |
| 5,724,987 A | 3/1998 | Gevins et al. | |
| 5,983,129 A | 11/1999 | Cowan et al. | |
| 6,101,481 A * | 8/2000 | Miller | 705/7.13 |
| 6,167,298 A * | 12/2000 | Levin | A61B 5/0482 600/545 |
| 6,457,975 B1 * | 10/2002 | Miranda et al. | 434/236 |
| 2004/0018477 A1 * | 1/2004 | Olsen | 434/307 R |
| 2007/0123756 A1 * | 5/2007 | Kitajima et al. | 600/300 |
| 2008/0183314 A1 * | 7/2008 | Klouzal et al. | 700/90 |
| 2010/0145215 A1 * | 6/2010 | Pradeep et al. | 600/544 |
| 2011/0212428 A1 * | 9/2011 | Baker | G09B 5/00 434/308 |
| 2012/0330869 A1 * | 12/2012 | Durham | 706/16 |
| 2013/0046206 A1 * | 2/2013 | Preminger | 600/595 |
| 2013/0311270 A1 * | 11/2013 | Daftary | G06Q 30/0269 705/14.43 |
| 2014/0023999 A1 * | 1/2014 | Greder | 434/236 |

OTHER PUBLICATIONS

Electroencephalography, frequency bands comparison, Wikipedia, <http://en.wikipedia.org/wiki/Electroencephalography#Comparisontable_table_of_EEG_rhythmic_activity_frequency_bands>.*

* cited by examiner

*Primary Examiner* — Robert J Utama
*Assistant Examiner* — Thomas Hong
(74) *Attorney, Agent, or Firm* — Buchanan Ingersoll & Rooney PC

(57) ABSTRACT

A method and system are disclosed for determining a task for a subject, which includes sensing electrical activity along a scalp of a subject; characterizing a mental state of the subject based on the electrical activity of the subject; comparing the mental state of the subject with a pre-defined task list to select a task for the subject based on the mental state of the subject; and assigning the task to the subject based on the comparison of the mental state of the subject and the pre-defined task list.

12 Claims, 3 Drawing Sheets

METHOD AND SYSTEM FOR EEG-BASED TASK MANAGEMENT

FIELD

This invention relates to a method and system for an electroencephalograph (EEG) based mental estimation method, and more particularly, a method and system for EEG-based task management based on matching an estimated mental state with tasks from a pre-defined task list.

BACKGROUND

Improving workers' productivity has benefits both for individual workers and for an organization as a whole. Accordingly, it would be desirable to have a system that helps workers improve their productivity levels by monitoring their biological and/or brainwave activity including obtaining EEG data and assigning tasks accordingly.

SUMMARY

In consideration of the above issues, it would be desirable to have a method and system, which provides for an EEG-based task management based on matching an estimated mental state of a subject with tasks from a pre-defined task list and assigning one or more tasks to the subject.

In accordance with an exemplary embodiment, a method is disclosed for determining a task for a subject, comprising: sensing electrical activity along a scalp of a subject; characterizing a mental state of the subject based on the electrical activity of the subject; comparing the mental state of the subject with a pre-defined task list to select a task for the subject based on the mental state of the subject; and assigning the task to the subject based on the comparison of the mental state of the subject and the pre-defined task list.

In accordance with an exemplary embodiment, a method is disclosed for determining a task for a subject, comprising: sensing biological activity of a subject; characterizing a mental state of the subject based on the biological activity of the subject; comparing the mental state of the subject with a pre-defined task list to select a task for the subject based on the mental state of the subject; and assigning the task to the subject based on the comparison of the mental state of the subject and the task allocation database.

In accordance with an exemplary embodiment, a system is disclosed for determining a task for a subject, comprising: a sensing device for sensing electrical activity over one or more frequency bands along a scalp of a subject; and a computer device having executable instructions for: characterizing a mental state of the subject based on the electrical activity of the subject; comparing the mental state of the subject with a pre-defined task list to select a task for the subject based on the mental state of the subject; and assigning the task to the subject based on the comparison of the mental state of the subject and the pre-defined task list.

In accordance with an exemplary embodiment, a non-transitory computer readable medium containing a computer program having computer readable code embodied is disclosed for determining a task for a subject, comprising: sensing electrical activity along a scalp of a subject; characterizing a mental state of the subject based on the electrical activity of the subject; comparing the mental state of the subject with a pre-defined task list to select a task for the subject based on the mental state of the subject; and assigning the task to the subject based on the comparison of the mental state of the subject and the pre-defined task list.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
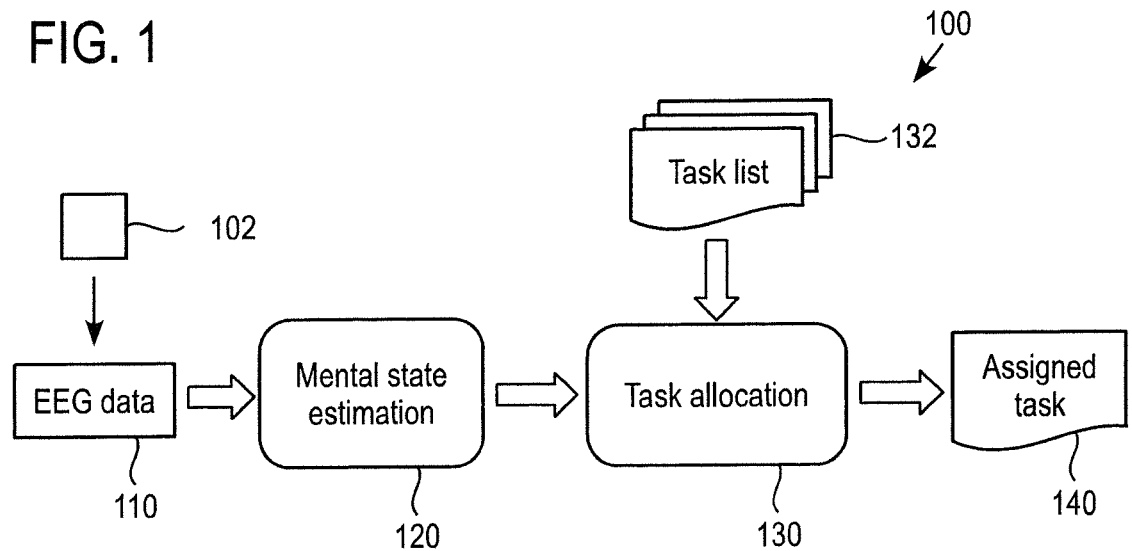
FIG. 1 illustrates an exemplary system, which uses EEG data collected from a subject to estimate his or her mental state, and wherein based on the mental state, an optimal task is assigned from the task list in accordance with an exemplary embodiment.

Reference will now be made in detail to the embodiments of the invention, examples of which are illustrated in the accompanying drawings. Wherever possible, the same reference numbers are used in the drawings and the description to refer to the same or like parts.

This disclosure relates to an electroencephalograph (EEG) based mental estimation method. In accordance with an exemplary embodiment, a task management system can choose a specific task and/or tasks to assign to a subject based on his or her current mental state. EEG signals can be used to distinguish different mental states, for example, the system as disclosed herein can assign a task that is suitable, and preferably most suitable, for a current mental state of a subject or subjects. For example, when a particular software engineer is in a more creative mindset, he can select or be assigned to work on research; when he is in a less creative but more focused state he can work on writing code; when he is less focused he can work on processing paperwork.

In accordance with an exemplary embodiment, a method for determining a task for a subject, which includes: sensing electrical activity along a scalp of a subject; characterizing a mental state of the subject based on the electrical activity of the subject; comparing the mental state of the subject with a pre-defined task list to select a task for the subject based on the mental state of the subject; and assigning the task to the subject based on the comparison of the mental state of the subject and the pre-defined task list.

In accordance with an exemplary embodiment, a method for determining a task for a subject is disclosed, which includes: sensing biological activity of a subject; characterizing a mental state of the subject based on the biological activity of the subject; comparing the mental state of the subject with a pre-defined task list to select a task for the subject based on the mental state of the subject; and assigning the task to the subject based on the comparison of the mental state of the subject and the task allocation database.

As used herein biological activity relates to the study of life and living organisms, which can include biological activities such as perspiration or sweat, heart rate, nervous signals, brain waves, and/or combinations thereof. The biological activities can be measured with any suitable sensing devices, which can detect changes in biological activity of a subject. For example, brainwaves can be measured and/or detected using an EEG, wherein the EEG includes one or more electrodes, which detect voltage fluctuations resulting from the combined electrical signaling activity of neurons within the brain.

In accordance with an exemplary embodiment, the biological activity can include any activity related to an activity, which requires the subject to perform a visual, an acoustic, a gustatory or taste, a smell, and/or a touch activity and measuring responses associated therewith based on an objective measurement. In accordance with an embodiment, the biological sensor is a device which changes various types of physicochemical properties of target to a different state, for example electrical signals. For example, a heart rate monitor could be used for measuring the heart rate of a subject, or a temperature sensor for sensing changes in body temperature.

FIG. 1 illustrates a system 100, which uses EEG data 110 collected from a subject and/or user (not shown) to estimate his or her mental state, and wherein based on the mental state, a task can be assigned to the subject and/or user from a task list in accordance with an exemplary embodiment. As shown in FIG. 1, the system 100 includes a brain wave recording device 102, which can be an EEG recording device, which generates EEG data 110. In accordance with an exemplary embodiment, an estimation of the mental state 120 of the subject is generated from the EEG data 110. The mental state of the subject is compared with a pre-defined task list 132 to select a task allocation 130 for the subject based on the mental state of the subject, and a task 140 is assigned to the subject based on the comparison of the mental state of the subject and the task allocation database.

In accordance with an exemplary embodiment, the EEG recording device 102 can be any suitable EEG recording devices, from a relatively inexpensive commercial device with only one electrode to more advanced medical-grade devices with dozens of electrodes. For example, in accordance with an exemplary embodiment, the brainwave sensing device 102 can be an EEG recording device having a plurality of sensors, which can obtain a plurality of signals, which can be analyzed to information about an individual's mental state. In accordance with an exemplary embodiment, the brain wave sensing device 102 can be a single-electrode EEG device, which can achieve relatively good accuracy at classifying mental states as disclosed herein. Thus, in accordance with an exemplary embodiment, commercial devices, which are significantly easier to use, can be effective for this system.

In accordance with an exemplary embodiment, the brainwave sensing device 102 is a device, which records electrical activity along the scalp. For example, the brainwave sensing device 102 can be an electroencephalography (EEG), which measures voltage fluctuations resulting from the combined electrical signaling activity of neurons within the brain. An EEG employs one or more electrodes on the scalp to measure this electrical activity, which is often rhythmic or oscillatory in nature. The rhythmic activity can be analyzed in terms of activity in different frequency bands, which are extracting using spectral methods. However, in accordance with an exemplary embodiment, any type of device which senses electrical activity along the scalp can be used.

For example, an EEG uses a plurality of electrodes, which detect the voltage fluctuations. The plurality of electrodes can be in the form of a cap or netting, which places the plurality of electrodes in one or more desired location along the scalp. Alternatively, the electrode can be positioned on the subject individually or by any suitable manner. In addition, touchless sensors or other sensors, which do not make contact with the scalp of the subject, can be used to detect the electrical activity.

The electrical activity from the brainwave sensing device 102 can be transmitted via a connection or wire to the data processing system. The sensing device 102 can alternatively include wireless technology, which transmits the data or electrical activity obtained from the subject to the data processing system without a hard connection or wire. The brainwave sensing device 102 senses brainwave signals of a subject, which can be recorded over one or more frequency bands.

For example, for an EEG, the frequency bands recorded can be between approximately 0.1 hertz ("Hz") to approximately 100 hertz (Hz). In accordance with an exemplary embodiment, each of the frequency bands can be generally classified within one or more frequency bands. For example, frequencies of 4 hertz (Hz) or lower can be assigned to the delta ($\Delta$) band, from approximately 5 Hz to 7 Hz to the theta ($\theta$) band, from approximately 8 Hz to 15 Hz to the alpha ($\alpha$) band, from approximately 16 Hz to 24 Hz to the beta ($\beta$) band, and from approximately 24 Hz to 40 Hz to the gamma ($\gamma$) band. However, the frequencies are only exemplary and different ranges can be used to define a frequency band in accordance with functional and behavioral properties. For example, delta waves are usually associated with the deepest stages of sleep (3 and 4 NREM), also known as slow-wave sleep (SWS), and aid in characterizing the depth of sleep.

In accordance with an embodiment, the EEG-based task management method can include the placement of one or more electrodes on the scalp of the subject using an electrode cap or netting. Alternatively, the electrodes can be individually placed on the scalp of the subject as desired.

In accordance with an example, the signal extraction for the EEG is the raw voltage fluctuation ($\mu$V) signal between approximately 0 and 100 Hz within a defined or set period of time (for example, approximately 10 minutes in the morning of working days), which is collected by the EEG device. The raw signals are transferred into the frequency domain by FFT (Fast Fourier Transform) and divided into one or more frequency bands. For example, the one or more frequency bands can be defined as delta ($\Delta$), four or less Hz, theta ($\theta$) approximately 5 to 7 Hz, alpha ($\alpha$) approximately 8 to 15 Hz, beta ($\beta$) approximately 16 to 24 Hz, and gamma ($\gamma$) approximately 24-40 Hz. In accordance with another aspect, the one or more frequency bands can be defined delta ($\Delta$), less than 4 hertz ("Hz')), theta ($\theta$) approximately 4 to 8 Hz, alpha ($\alpha$) approximately 8 to 13 Hz, beta ($\beta$) approximately 13-30 Hz, and gamma ($\gamma$) approximately 30 to 100 Hz. The spectrum can also be obtained as the power of each of the one or more frequency bands.

In accordance with an exemplary embodiment as shown in FIG. 1, the EEG data 110 is recorded from a subject using a brain wave sensing device 102, and an estimate of mental state 120 of the subject is made. Based on the estimate of the mental state 120 of the subject, an assigned task 140 can be selected that is appropriate, for the subject's current estimated mental state based a task allocation 130. This task allocation process is based on matching the estimated mental state of the subject with tasks from a pre-defined task list 132, where all tasks in the list are annotated with information about the estimated mental states for which they are most suitable.

For example, in accordance with an exemplary embodiment, the system includes: (1) a set of mental state dimensions (for example, creativity, focus, relaxation) by which to characterize an individual's mental state; (2) a task list, with each task indicating what levels of each mental state dimension are ideal for each task; and (3) an EEG recording device.

In accordance with an exemplary embodiment, the method and system for EEG-based task management can consist of two main phases: (1) mental state estimation, which can be based on a biological signal, for example, an EEG signal, which can be used by a machine learning-based algorithm to estimate mental states of the subject; and (2) a task allocation process, wherein the estimated predicted mental state is matched against the requirements of different tasks to assign an appropriate and/or optimal task.

In accordance with an exemplary embodiment, a mental state estimation can either be done using either a rule-based method, where a method and/or process based a determination by an estimation of mental states to pre-define how features of the EEG signal map onto rankings for different mental state dimensions, or alternatively, a learning based method, where the mapping is learned from previously collected EEG data that is collected and/or used during actual activities or diagnostic testing by one or more subjects. In accordance with an exemplary embodiment, by optimizing task assignment according to an individual's current mental state, the individual's overall productivity can be improved.

In accordance with an exemplary embodiment, EEG signals can be recorded when a subject is performing one of a set of diagnostic tasks (for example, staring at a blank screen or trying to meditate). The EEG is then analyzed by dividing the EEG signal into a plurality of windows or segments. For example, each of the plurality of windows or segments can be 0.5 seconds, 1.0 seconds, 2.0 seconds, 3.0 seconds, 4.0 seconds, 5.0 seconds, greater than 5.0 seconds and less than 10 seconds.

In accordance with an exemplary embodiment, various features can be computed from the windowed EEG signal to help estimate and/or determine the subject's mental state. For example, one of the various features used in EEG analysis are the power in pre-defined frequency bands, which include:

Delta—deep, non-REM sleep
Theta—Intuitive, creative, imaginative, dreaming
Alpha—Relaxed (but not drowsy)
Beta—Focused, thinking, alert
Gamma—Motor functions, higher mental activity.

In accordance with an exemplary embodiment, the signals or power in the frequency bands can be obtained by performing a fast Fourier transform (FFT) on the windowed EEG signal from each channel. In addition, besides the frequency band powers, other features can be used to distinguish mental states, for example, can include signal entropy, spectral entropy, and/or standard deviation. For example, if a device with multiple electrodes is being used, additional features such as the coherence or mutual information between pairs of electrodes can also be used.

In accordance with an exemplary embodiment, each of the selected features can be concatenated into a vector, and this feature vector can be used to represent that window of EEG signal during mental state classification.

Figure 2:
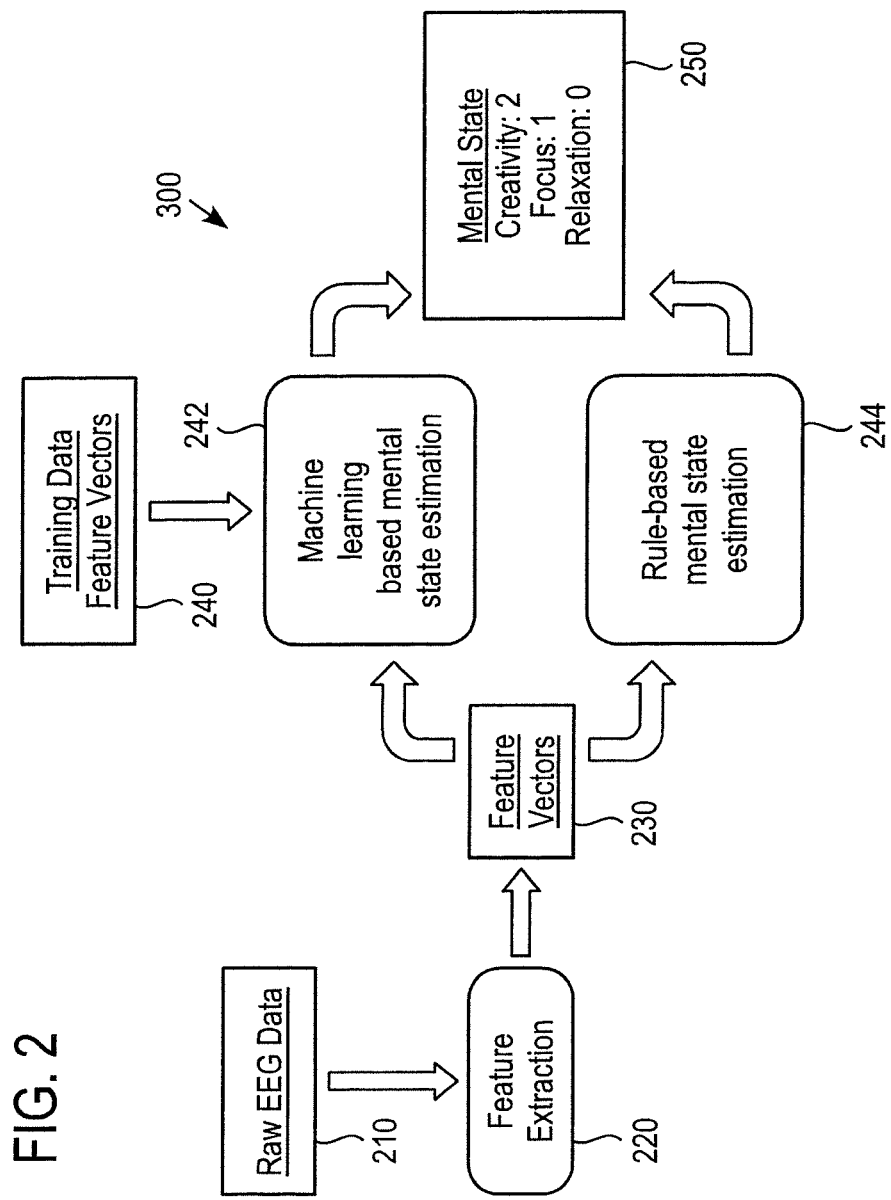
FIG. 2 illustrates an exemplary process for determining a mental state prediction from raw EEG data in accordance with an exemplary embodiment.

FIG. 2 illustrates an exemplary process 200 for a mental state prediction from raw EEG data in accordance with an exemplary embodiment. As shown in FIG. 2, the raw EEG data 210 is subjected to a feature extraction 220, for example, a fast Fourier transform (FFT), which generates one or more feature vectors 230. The feature vectors 230 are then subjected to at least one training data feature vector process 240, the at least one training data feature process 240 can include a learning based mental state estimation 242, and/or a rule-based mental state estimation 244. An estimated mental state 250 can then be generated based on the analysis of the feature vectors.

For example, in accordance with an exemplary embodiment, after feature extraction 220, the estimation of a subject's mental state can be determined with either a rule-based or a learned classification-based method 242, 244.

In accordance with an exemplary embodiment, in the learning-based approach (mental state estimation approach) 242, a machine learning algorithm can be employed to learn the mapping from the EEG feature vectors 230 to mental state from training examples. For example, In accordance with an exemplary embodiment, a subject can provide training examples by performing a plurality of diagnostic tasks, then indicating their mental state ratings based on either personal judgment or their productivity soon before or after performing the plurality of diagnostic tasks.

In accordance with an exemplary embodiment, in the rule-based approach 244, the mapping from the one or more feature vectors 230 to an estimated mental state can be based on using predefined rules, for example, the pre-defined frequency bands as disclosed herein, which can include delta—deep, non-REM sleep; theta—intuitive, creative, imaginative, dreaming; alpha—relaxed (but not drowsy); beta—focused, thinking, alert; and gamma—motor functions, higher mental activity. For example, if the relative alpha power is at least 0.25, then the subject can be in a relaxed state.

In accordance with an exemplary embodiment, the pre-defined rules can be mathematically complex and/or include data generated from one or more behavioral studies.

In accordance with an exemplary embodiment, the determination of which machine learning algorithm is used, can be dependent on the nature of the mental state dimensions. If the mental state dimensions are binary, for example, creativity is either "yes" or "no", target algorithms can include a support vector machine (SVM) classifier. In accordance with an exemplary embodiment, for a standard linear SVM, a vector w and constant b from training data can be learned in order to create the decision rule of the following form:

$$\text{CREATIVITY} = \begin{cases} \text{YES} & w*x_i - b < 0 \\ \text{NO}, & w*x_i - b \geq 0 \end{cases}$$

where $x_i$ is a feature vector. The SVM can be a maximum-margin classifier; wherein the terms w and b are learned in such a way as to maximize the distance from the hyperplane $w*x-b=0$ to the closest points on either side of it.

In an exemplary embodiment, if the mental state dimensions have a plurality or multiple options, for example, attention can be rated on a scale of 1-5, a regression model such as Gaussian Process Regression can be used to output a predicted values.

Figure 3:
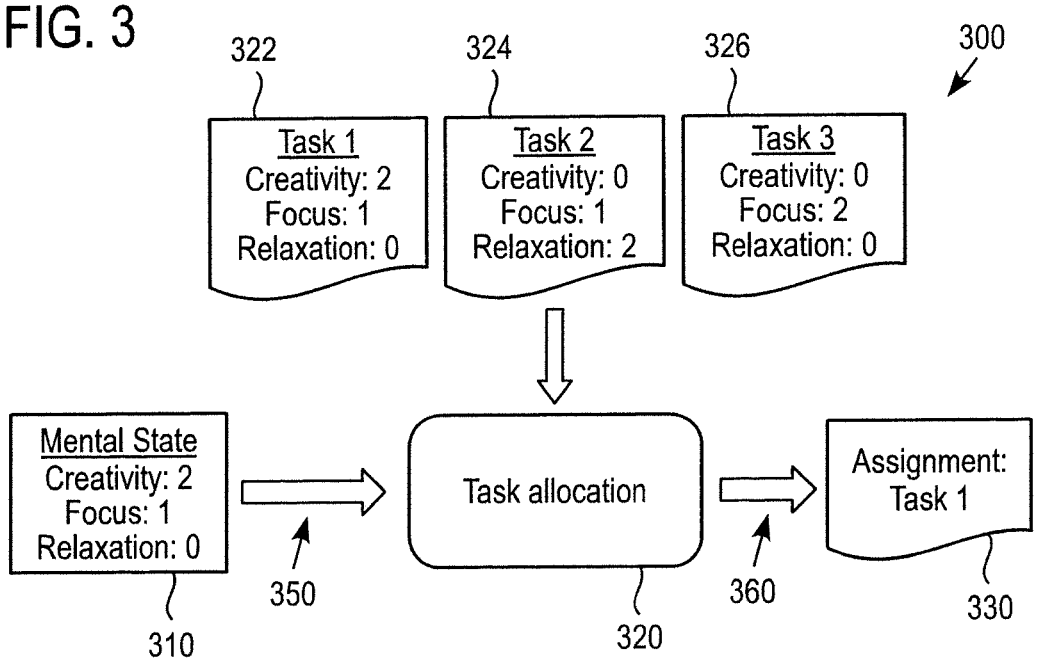
FIG. 3 illustrates an exemplary task allocation process from a predicted mental state in accordance with an exemplary embodiment.

FIG. 3 illustrates an exemplary task allocation process from a predicted mental state in accordance with an exemplary embodiment. As shown in FIG. 3, the task allocation process 300 includes an estimated or projected mental state 310, a task allocation database 320, which includes a plurality of tasks 322, 324, 326, and a task assignment 330 based on the comparison of the estimated mental state 310 of the subject with a pre-defined task list to select a task 330 for the subject based on the mental state of the subject, and assigning the task 322, 324, 326, to the subject based on the comparison of the mental state of the subject and the task allocation database 320.

In accordance with an exemplary embodiment, the output of mental state estimation 310 is a vector of mental state dimensions of the form:
m={Creativity Level, Focus Level, Relaxation Level, ... }

In accordance with an exemplary embodiment, each task 322, 324, 326 has an associated vector specifying its ideal levels of each mental state dimension. For example, for a task j, a sample vector could be:
$\theta_j$={Ideal Creativity Level, Ideal Focus Level, Ideal Relaxation Level, ... }

In accordance with an exemplary embodiment, a task's mental requirement can be actually specified by a set of vectors, in order to represent ranges of acceptable values for different mental state dimensions.

After the mental state is estimated, the subject can be assigned one or more tasks whose mental state requirements, most closely match the predicted or estimated mental state of the subject. For example, in accordance with an exemplary embodiment, the actual task assignment can be based on a relatively straightforward metric, such as choosing the task with the minimum Euclidean distance between the estimated current mental state and the ideal mental state for that task. For example, $$\text{Assigned task} = \underset{j}{\text{argmin}} \|\theta_j - m\|$$

As shown in FIG. 3, in step 350, the output of mental state estimation 310 is a vector of mental state dimensions of the form the estimated mental state of the subject 310 is compared to a plurality of tasks 322, 324, 326, which are represented by a specified by a set of vectors with the task allocation database 320. In step 360, the subject can be assigned one or more tasks whose mental state requirements, most closely match the predicted or estimated mental state of the subject based on vector analysis of tasks within the task allocation database 320.

In accordance with an exemplary embodiment, EEG signals can show variability, which can be due to one or more different causes. For example, some changes in EEG signals and/or data can be as a result of the mental task a subject or person is performing at a certain time, for example, task-to-task variability. In addition, other changes in EEG signals and/or data can be reflective of longer term mental states, for example, whether the person has a mental disorder. In accordance with an exemplary embodiment, the EEG-based task management system and methods as disclosed herein, is primarily used to detect day-to-day and/or hour-to-hour variability in the EEG signal. However, the system and methods as disclosed herein can also be extended to periods of time greater than one day.

In accordance with an exemplary embodiment, a dataset of EEG signals were obtained from a subject, the subject being a right-handed, native English speaking, male college student. Every morning for five days, the subject spent roughly 20 minutes performing different mental tasks while EEG signals were recorded from a single dry forehead sensor. The results were then examined and contrasted for task-to-task variability and day-to-day variability in the dataset. In accordance with an exemplary embodiment, the mental tasks can include: (1) meditating: subject was instructed to meditate while staring at a dot on the screen; (2) reading colors: subject read simple English colors words (e.g. red, blue) as they appeared on the screen; (3) Stroop test: subject was presented with simple English color words, printed in a color different from the text of the word, and the subject was instructed to say the color in which the word was printed (not say the word itself); (4) 2-back test: subject was presented with a series of simple English color words, and was instructed to press a button when the current word was the same as the word that appeared two words previously, for example, in response the series "red blue green blue red green" the subject should only press the button on the second "blue".

In accordance with exemplary embodiment, to determine sources of day-to-day variability in the EEG signal, ANOVA tests (analysis of variance) were run on the feature vectors. In accordance with an exemplary embodiment, features that were examined included relative power in predefined frequency bands (alpha, beta, etc.) and ratios between powers in predefined frequency bands. For example, some mental tasks have different amounts of day-to-day variability, and/or affect different features in different ways. In accordance with an exemplary embodiment, ANOVA tests can be run on data from each mental task individually, to test the effect of different days on the EEG signal features.

In accordance with an exemplary embodiment, the following table summarizes features which had the most significant day-to-day variation (highest F-score) for each task:

TABLE 1

Features with significant day-to-day variability. F-scores resulting from one-way ANOVAs are shown in parentheses. All F-scores are statistically significant, with $p < .01$.

| Task | Features with Most Significant Day-to-day Variation |
|---|---|
| Meditating | Relative delta power (34.9), Relative gamma power (27.7) |
| Reading colors | Relative delta power (36.9), Relative gamma power (25.3) |
| Stroop | Relative theta power (14.1), Theta/low beta ratio (9.7) |
| 2-back | Relative theta power (25.3), Theta/high gamma ratio(22.7) |

In accordance with an exemplary embodiment, the mental tasks which were not designed to require high levels of attention, for example, meditating and reading colors, had similar features which showed day-to-day variability. In addition, tasks that were designed to require high levels of attention also had similar features showing day-to-day variability, yet these features were distinct from those from the low-attention tasks. In accordance with an exemplary embodiment, features with significant day-to-day variation, in the task management system can be used. In accordance with an exemplary embodiment, a method for managing and assigning tasks to an individual that optimizes for his/her mental state at that time is disclosed.

In accordance with an exemplary embodiment, because the method and system does not pre-specify particular mental state dimensions, the method and system can be flexible. For example, suppose that a subject did not want to define a task according to traditional mental state dimensions. For example, he/she may be unable to describe a mindset that is good for debugging code in terms of traditional dimensions such as creativity and focus. Instead, he/she can define a new dimension, for example, "good for debugging" and train it accordingly. In accordance with an exemplary embodiment, the debugging task can be assigned when the subject's mental state is rated relatively highly on the "good for debugging" dimension. In accordance with an exemplary embodiment, the method and system describe a method and system in which the prediction of mental state dimensions such as focus and creativity forms a layer between EEG signal processing and task allocation. In accordance with an exemplary embodiment, the method and system includes in which the relatively best task is predicted more directly from the EEG signal.

Figure 4:
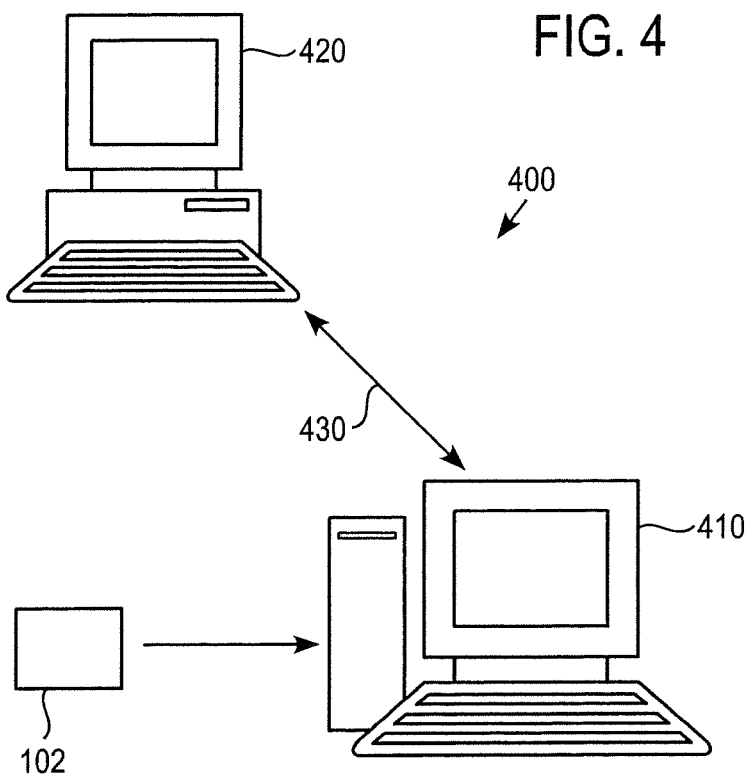
FIG. 4 is an illustration an exemplary EEG-based task management system in accordance with an exemplary embodiment.

FIG. 4 is an illustration of a system 400 for processing a method and system of on-line decision making support. As shown in FIG. 4, the system 400 includes a brain wave sensing device 102, a computer device or data processing system 410 for processing the data received from the brain wave sensing device 102 and determining a task for a subject as disclosed herein.

The data processing system 410 includes a processor or central processing unit (CPU), one or more memories for storing software programs and data (such as files to be printed). The data processing system 410 also includes an operating system (OS), which manages the computer hardware and provides common services for efficient execution of various software programs. The processor or CPU carries out the instructions of a computer program, which operates and/or controls at least a portion of the functionality of the data processing system. Examples of data processing system 410 include and are not limited to personal computers and/or personal digital assistants (PDAs). The operating system acts as an intermediary between the software programs and hardware components within the data processing system 410. The operating system (or OS) manages the computer hardware and provides common services for efficient execution of application software.

In accordance with an exemplary embodiment, the data processing system 410 can be connected to a remote video display monitor 420 via a network 430 for displaying the results of the comparison of the estimated mental estimate of the subject and the task list for the subject in the form of at least one assigned task. The video display monitor 420 can be a device having a screen, which display an image including but not limited to computers, monitors, and/or personal digital assistants (PDAs). Examples of the network 430 consistent with embodiments of the invention include, but are not limited to, the Internet, an intranet, a local area network (LAN) and a wide area network (WAN). The data processing system 410 and the video display monitor 420 can also be connected with a wire and/or wireless technology by using radio frequency (RF) and/or infrared (IR) transmission.

In accordance with another exemplary embodiment, a non-transitory computer readable medium containing a computer program having computer readable code embodied for determining a task for a subject, which includes: sensing electrical activity along a scalp of a subject; characterizing a mental state of the subject based on the electrical activity of the subject; comparing the mental state of the subject with a pre-defined task list to select a task for the subject based on the mental state of the subject; and assigning the task to the subject based on the comparison of the mental state of the subject and the pre-defined task list.

The non-transitory computer usable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

The method and system for on-line decision making support as disclosed herein may be implemented using hardware, software or a combination thereof. In addition the method and system for an EEG-based task management system as disclosed herein may be implemented in one or more computer systems or other processing systems, or partially performed in processing systems such as personal digit assistants (PDAs). In yet another embodiment, the invention is implemented using a combination of both hardware and software.

As used herein, a "task", can include specific jobs, assignments, and/or activities related to an occupation, job, and/or employment, and non-job related activities. In addition, a task as used herein can be any activity that needs to be accomplished within a defined period of time or by a deadline. For example, a task can be broken down into assignments which can have a defined start and end date or a deadline for completion.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for determining an occupational task for a subject, comprising:
sensing electrical activity along a scalp of a subject with an electrical sensing device;
processing the electrical activity to generate a vector of the current mental state of the subject, the vector including a creativity level, a focus level, and a relaxation level;
comparing the vector of the current mental state of the subject with vectors in a pre-defined task list to select a task for the subject based on the current mental state of the subject, the pre-defined task list including a plurality of tasks, each of the plurality of tasks in the pre-defined task list having a vector of ideal mental state for the task to be assigned; and
assigning the task to the subject from the plurality of tasks based on the comparison of the vector of the current mental state of the subject and the vectors of the pre-defined task list, wherein the task is an activity that is performed by the subject, and the assigning of the task is based on a minimum Euclidean distance between the vector of the current mental state of the subject and the vector of ideal mental state for the task assigned to the subject.

2. The method of claim 1, comprising:
sensing the electrical activity of the subject using an electroencephalograph (EEG) device.

3. The method of claim 2, comprising:
recording the electrical activity over one or more frequency bands, wherein the one or more frequency bands include electrical signals between approximately 0.1 Hz and 100 Hz.

4. A method for determining a task for a subject, comprising:
sensing biological activity of a subject with a sensing device;
processing the biological activity to generate a vector of the current mental state of the subject, the vector including a creativity level, a focus level, and a relaxation level;
comparing the vector of the current mental state of the subject with vectors in a pre-defined task list to select a task for the subject based on the current mental state of the subject, the pre-defined task list including a plurality of tasks, each of the plurality of tasks in the pre-defined task list having a vector of ideal mental state for the task to be assigned; and
assigning the task to the subject from the plurality of tasks based on the comparison of the vector of the current mental state of the subject and the vectors of the pre-defined task list, wherein the task is an activity that is performed by the subject, and the assigning of the task is based on a minimum Euclidean distance between the vector of the current mental state of the subject and the vector of ideal mental state for the task assigned to the subject.

5. The method of claim 4, wherein the biological signals are brainwave signals, and the biological activity is electrical activity, which is obtained using an electroencephalograph (EEG) device.

6. The method of claim 5, comprising:
recording the electrical activity over one or more frequency bands, wherein the one or more frequency bands include electrical signals between approximately 0.1 Hz and 100 Hz, and wherein the plurality of signals are in pre-defined frequency bands as follows:
(1) 0.1 to 3 Hz;
(2) 4 Hz to 7 Hz;
(3) 8 Hz to 12 Hz;
(4) 12 Hz to 30 Hz; and
(5) 30 Hz to 100 Hz.

7. A system for determining a task for a subject, comprising:
a sensing device for sensing electrical activity over one or more frequency bands along a scalp of a subject; and
a computer device having executable instructions for:
processing the electrical activity to generate a vector of the current mental state of the subject, the vector including a creativity level, a focus level, and a relaxation level;
comparing the vector of the current mental state of the subject with vectors in a pre-defined task list to select a task for the subject based on the current mental state of the subject, the pre-defined task list including a plurality of tasks, each of the plurality of tasks in the pre-defined task list having a vector of ideal mental state for the task to be assigned; and
assigning the task to the subject from the plurality of tasks based on the comparison of the vector of the current mental state of the subject and the vectors of the pre-defined task list, wherein the task is an activity that is performed by the subject, and the assigning of the task is based on a minimum Euclidean distance between the vector of the current mental state of the subject and the vector of ideal mental state for the task assigned to the subject.

8. The system of claim 7, wherein the sensing device is an electroencephalograph (EEG) device; and
wherein the electrical activity is recorded over one or more frequency bands, wherein the one or more frequency bands include electrical signals between approximately 0.1 Hz and 100 Hz, and wherein the plurality of signals are in pre-defined frequency bands.

9. The system of claim 8, comprising:
recording the electrical activity over one or more frequency bands, wherein the one or more frequency bands include electrical signals between approximately 0.1 Hz and 100 Hz.

10. A non-transitory computer readable medium containing a computer program having computer readable code embodied for determining a task for a subject, the computer readable program code configured to execute a process comprising:
sensing electrical activity along a scalp of a subject with an electrical sensing device;
processing the electrical activity to generate a vector of the current mental state of the subject, the vector including a creativity level, a focus level, and a relaxation level;
comparing the vector of the current mental state of the subject with vectors in a pre-defined task list to select a task for the subject based on the current mental state of the subject, the pre-defined task list including a plurality of tasks, each of the plurality of tasks in the pre-defined task list having a vector of ideal mental state for the task to be assigned; and
assigning the task to the subject from the plurality of tasks based on the comparison of the vector of the current mental state of the subject and the vectors of the pre-defined task list, wherein the task is an activity that is performed by the subject, and the assigning of the task is based on a minimum Euclidean distance between the vector of the current mental state of the subject and the vector of ideal mental state for the task assigned to the subject.

11. The computer readable medium of claim 10, comprising:
sensing the electrical activity of the subject using an electroencephalograph (EEG) device.

12. The computer readable medium of claim 11, comprising:
recording the electrical activity over one or more frequency bands, wherein the one or more frequency bands include electrical signals between approximately 0.1 Hz and 100 Hz.

* * * * *